United States Patent
Kropp et al.

(10) Patent No.: US 6,752,036 B2
(45) Date of Patent: Jun. 22, 2004

(54) SETTING DEVICE FOR AN ADJUSTABLE GEARING MECHANISM

(75) Inventors: Jen-Uwe Kropp, Mintraching (DE); Ulf Scheuerer, Hagelstadt (DE); Karl Smirra, Wasserburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/430,646

(22) Filed: May 6, 2003

(65) Prior Publication Data

US 2003/0188595 A1 Oct. 9, 2003

Related U.S. Application Data

(63) Continuation of application No. PCT/DE01/04159, filed on Nov. 6, 2001.

(30) Foreign Application Priority Data

Nov. 6, 2000 (DE) .......................................... 100 54 977

(51) Int. Cl.⁷ .............................................. B60K 17/04
(52) U.S. Cl. ................................ 74/473.12; 74/473.26
(58) Field of Search ............................... 74/335, 337.5, 74/473.1, 473.12, 473.26, 473.21, 473.23

(56) References Cited

U.S. PATENT DOCUMENTS

| 1,591,242 A | 7/1926 | Simpson |
| 2,740,271 A | 4/1956 | Beler .............................. 64/11 |
| 3,013,413 A | 12/1961 | Luning ............................ 64/27 |
| 3,161,074 A | 12/1964 | Korthaus et al. ........... 74/424.8 |
| 3,258,985 A | 7/1966 | Jordan .......................... 74/472 |
| 3,621,675 A | 11/1971 | Conaghan et al. ............... 64/14 |
| 4,576,261 A | * 3/1986 | Barr .......................... 192/219.5 |
| 4,771,643 A | 9/1988 | Mott ................................ 74/2 |
| 5,012,725 A | * 5/1991 | Leary ............................. 92/63 |
| 5,334,095 A | 8/1994 | Colling et al. ............... 464/101 |
| 5,544,538 A | * 8/1996 | Takagi et al. ................. 74/335 |
| 5,954,179 A | 9/1999 | Osborn ...................... 192/219.5 |
| 5,984,260 A | 11/1999 | Rawson et al. ................ 251/71 |
| 6,431,317 B1 | * 8/2002 | Coe .......................... 185/40 R |

FOREIGN PATENT DOCUMENTS

| DE | 4422257 C1 | 11/1995 | ........... F16H/59/08 |
| EP | 0198114 | 10/1985 | ........... F16H/61/32 |
| JP | 11325243 | 11/1999 | ........... F16H/63/34 |

OTHER PUBLICATIONS

PCT Propostion and Supplement 2000P16724WO; 13 pages, Aug. 24, 2001.
PCT International Search Report PCT/DE01/04159; 8 pages, Jul. 22, 2002.
PCT Preliminary Test Report PCT/DE01/04159; 11 pages, Feb. 20, 2003.

* cited by examiner

Primary Examiner—David Fenstermacher
(74) Attorney, Agent, or Firm—Baker Botts L.L.P.

(57) ABSTRACT

The invention relates to a setting device for an adjustable gearing mechanism, in particular, for selecting a parking position in an automatic transmission. The inventive setting device comprises a mechanical setting element, an intermediate gearing mechanism for transferring the setting motion of the setting element to a control element of the adjustable gearing mechanism. A mechanical energy store, which can be replenished once again by the setting element, is provided for driving the intermediate mechanism when the setting element malfunctions.

42 Claims, 10 Drawing Sheets

SETTING DEVICE FOR AN ADJUSTABLE GEARING MECHANISM

CROSS-REFERENCE TO RELATED APPLICATION

This application is a continuation of co-pending International Application No. PCT/DE01/04159 filed Nov. 6, 2001 which designates the United States, and claims priority to German application number DE10054977.2 filed Nov. 6, 2000.

TECHNICAL FIELD OF THE INVENTION

The invention relates to a setting device for an adjustable gearing mechanism, in particular for selecting a parking position in an automatic transmission.

BACKGROUND OF THE INVENTION

Conventional automatic transmissions for automobiles usually have four preselection ranges for the different operating states of the automobile, namely a park position, a reverse position, a neutral position, and a drive position. In the park position, a mechanical locking mechanism (park lock) prevents the output shaft of the automatic transmission, and therefore the wheels of the automobile, from turning, thus preventing the automobile from rolling away unintentionally.

The desired preselection range is set by the driver by actuating a gearshift lever, while the link between the gearshift lever and the automatic transmission can be effected, for example, by means of electric cables, this shifting principle being known as "shift by wire". At the same time it must, however, be ensured that the park lock can also be activated even in the event of a total failure of the vehicle electronics system.

As a solution to this problem, a setting device for an automatic transmission is known from DE 44 22 257 C1, said device comprising, in addition to an electric motor for setting the desired preselection range in normal operation, also a spring which enables the park lock to be activated if the electric motor or the power supply fails. For this purpose, the driver simply has to release the spring, which is under tension during normal operation, by means of a Bowden cable, whereupon the spring activates the park lock.

However, a disadvantage with this known setting device is the fact that in order to activate the park lock in the event of a failure of the power supply, a manual intervention is still required by the driver, in that the latter actuates the Bowden cable.

Furthermore, EP 0 198 114 B1 discloses a setting device for a two-stage gearing mechanism, in which an electric motor axially displaces a rod in order to set the desired gearing mechanism stage, said rod being linked via a spring to a likewise axially movable carriage which carries the selection lever of the gearing mechanism. In this arrangement, the carriage can be locked in two positions by means of a stationary electromagnetically controllable locking element in the form of a solenoid, the two positions of the carriage each corresponding to a gearing mechanism stage. Thus, owing to the locking of the carriage by the locking element, the displacement of the rod by the electric motor does not lead to a change in the gearing mechanism stage, but simply leads to a tensioning of the spring. When the carriage is unlocked, the tensioned spring then drives the carriage into the respective other position, thus causing the other gearing mechanism stage to be set. However, the locking element fixes the carriage in the idle state to ensure that a failure of the power supply or a malfunction of the locking element does not lead to a change in the gearing mechanism stage. Rather, with the known setting device described in the foregoing, in the event of a failure of the power supply the gearing mechanism remains in the gearing mechanism stage just set.

SUMMARY OF THE INVENTION

The object of the invention is therefore to create a setting device for an automatic transmission in which the automatic transmission is controlled via electric cables, the park lock being activated automatically even in the event of a total failure of the vehicle electronics system.

The object is achieved, based on a known setting device for an adjustable gearing mechanism according to a setting element having a setting motion; an intermediate gearing mechanism for transferring the setting motion of the setting element to a control element of the adjustable gearing mechanism, the intermediate gearing mechanism comprising a movably mounted carrier linked to the setting element via a spindle, a carriage mounted in a linearly movable manner in parallel with the carrier and linked to the control element, and a controllable locking element to link the carriage to the carrier or separate it from the carrier; and a mechanical energy store for driving the carriage in the event of a failure of the setting element.

The invention comprises the general technical principle of providing a mechanical energy store in addition to the normal mechanical setting element for selecting the preselection range of the automatic transmission, said mechanical energy store enabling the park lock to be activated in the event of a failure of the normal setting element. An energy store of this type preferably comprises a spring, for example in the form of a helical or flat spiral spring, although other types of energy store which permit the park lock to be activated are also possible.

In a conventional automatic transmission, the preselection range of the automatic transmission is usually set via a control shaft, the angle position of which determines the preselection range. However, the rotation of the control shaft usually requires relatively large torques of up to 12 Nm, with the result that the energy needed for selecting the preselection range of the automatic transmission is transmitted by the mechanical setting element to the control shaft determining the preselection range via an intermediate gearing mechanism.

According to the invention, energy is introduced into the intermediate gearing mechanism via a movably mounted carriage, the carriage being linked on one hand to the energy store and on the other hand, via a controllable locking element, to the setting element. In the locked state, the setting element therefore acts on the carriage and thus enables the desired preselection range to be set. If the setting element fails, on the other hand, the locking element is unlocked, with the result that the movably mounted carriage is now linked only to the energy store and is pushed by the latter into the desired position, causing the automatic transmission to assume the desired preselection range. The controllable locking element for linking the carriage to the setting element preferably comprises an electromagnet, such that the locking element is automatically unlocked in the event of a power failure and thus releases the movably mounted carriage.

The carriage is preferably movable in a linear direction, but in principle it is also conceivable that the carriage is moved on a circular path or a path curved in some other way.

In the preferred embodiment, the setting element is linked to a carrier which is movably mounted parallel to the carriage, the locking element either linking the carriage to the carrier or separating it from the carrier. In normal operation with a properly functioning power supply, the locking element therefore links the carriage to the carrier, which is driven by the setting element such that the setting element moves the carriage and thereby sets the desired preselection range of the automatic transmission. If the power supply fails, on the other hand, the locking element severs the link between the carrier and the carriage, with the result that the setting element no longer acts on the carriage, which is then moved into the desired position by the energy store.

In an embodiment of the energy store as a spring, the spring can be disposed, for example, between the carrier and the carriage and can pretension the carrier with respect to the carriage. As an alternative to this, however, it is also possible that the spring is disposed between the carriage and a thrust bearing fixed in space and pretensions the carriage independently of the carrier with respect to the thrust bearing. In both cases, when carriage and carrier are unlocked, the energy of the tensioned spring leads to the carriage being moved by the spring, whereupon the automatic transmission assumes the desired preselection range.

In a variant of the invention, the carrier has a guide for the movable mounting of the carriage, such that the carriage can be moved relative to the carrier. In another variant of the invention, in contrast, a separate guide is provided both for the carrier and for the carriage.

BRIEF DESCRIPTION OF THE DRAWINGS

The invention is explained in more detail below in connection with the description of the preferred exemplary embodiments with reference to the figures, which show.

DETAILED DESCRIPTION OF THE PREFERRED EMBODIMENTS

Figure 1:
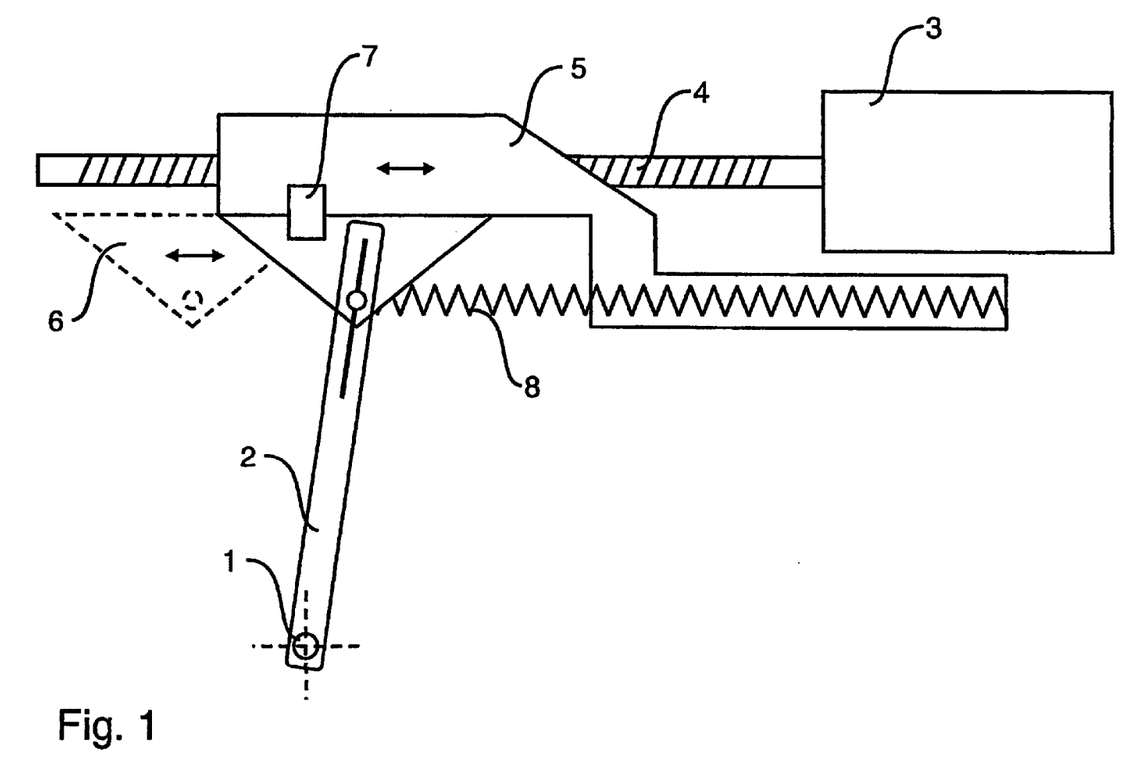
FIG. 1 shows a setting device according to the invention, wherein the carriage is guided by the carrier.

The setting device shown in FIG. 1 as a preferred exemplary embodiment of the invention enables the preselection range to be set for an automatic transmission for an automobile, the preselection range of the automatic transmission being specified by the angle position of a control shaft 1.

A lever 2 is fixed to the control shaft 1, because torques of up to 12 Nm are required for a rotation of the control shaft 1.

These torques are generated by an electric motor 3 having a worm shaft 4, the worm shaft 4 offering the advantage of being self-locking. As an alternative to the worm shaft 4, a shaft without self-locking can also be used for driving the spindle housing 5, however.

The worm shaft 4 acts on a spindle nut, which is disposed in a movably mounted spindle housing 5, such that the spindle housing 5 can be moved by the electric motor 3.

The spindle housing 5 further comprises a guide for a carriage 6, such that the carriage 6 is movable relative to the spindle housing 5 and parallel to this spindle housing.

The spindle housing 5 and the carriage 6 can, however, by locked together by means of an electromagnetic locking element 7, thereby preventing the carriage 6 shifting relative to the spindle housing 5.

The carriage 6 comprises a pivot point, via which the carriage 6 is linked to the lever 2, such that a displacement of the carriage 6 causes a rotation of the lever 2 and the control shaft 1, as a result of which the desired preselection range of the automatic transmission can be set.

Finally, also provided is an energy store in the form of a spring 8, which is disposed between the spindle housing 5 and the carriage 6 and pretensions the carriage 6 with respect to the spindle housing 5.

In the following, the normal operation of the setting device shown in FIG. 1 will now be described first. In this state, the power supply of the automobile is operational, such that the locking element 7 locks together the spindle housing 5 with the carriage 6. The electric motor 3 can therefore move both the spindle housing 5 and the carriage 6 via the worm shaft 4 and thereby rotate the lever 2 into the desired position.

The following description now explains the mode of operation of the setting device shown in FIG. 1 in the event of a power supply failure. In this case, the locking element 7 releases the lock between the spindle housing 5 and the carriage 6, with the result that the carriage 6 can move freely, independently of the position of the spindle housing 5. The pretensioning of the spring 8 then leads to the lever 2 being rotated counterclockwise, with the result that the automatic transmission assumes the park position.

The exemplary embodiment shown in FIGS. 2a and 2b largely corresponds to the exemplary embodiment shown in FIG. 1 and described above, so the same reference characters are used below for corresponding components and reference is made to the foregoing description in order to avoid repetition.

Figure 2A:
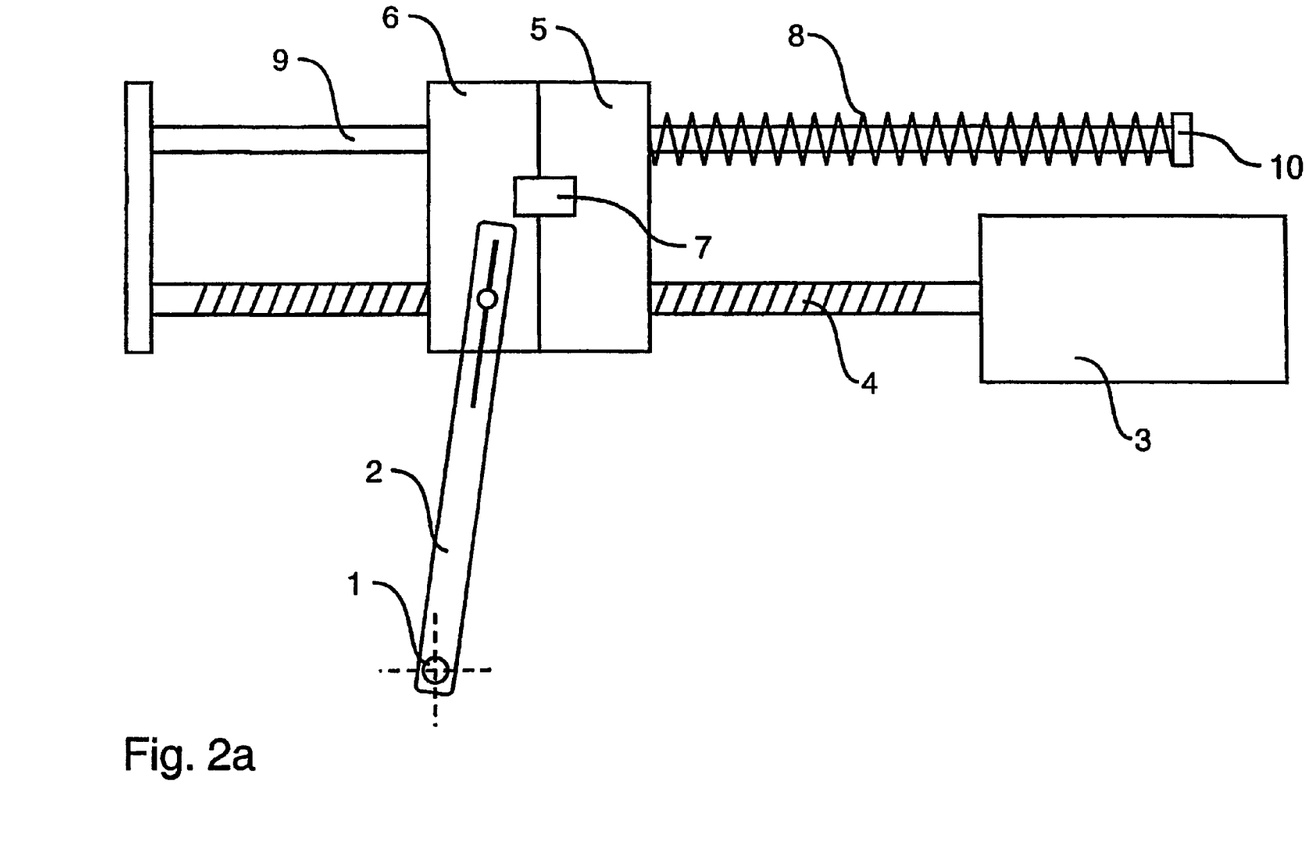
FIGS. 2a and 2b show a setting device according to the invention, wherein the carrier and the carriage each have a separate guide, the carriage being pretensioned by a spring having a thrust bearing fixed in space.
Figure 2B:
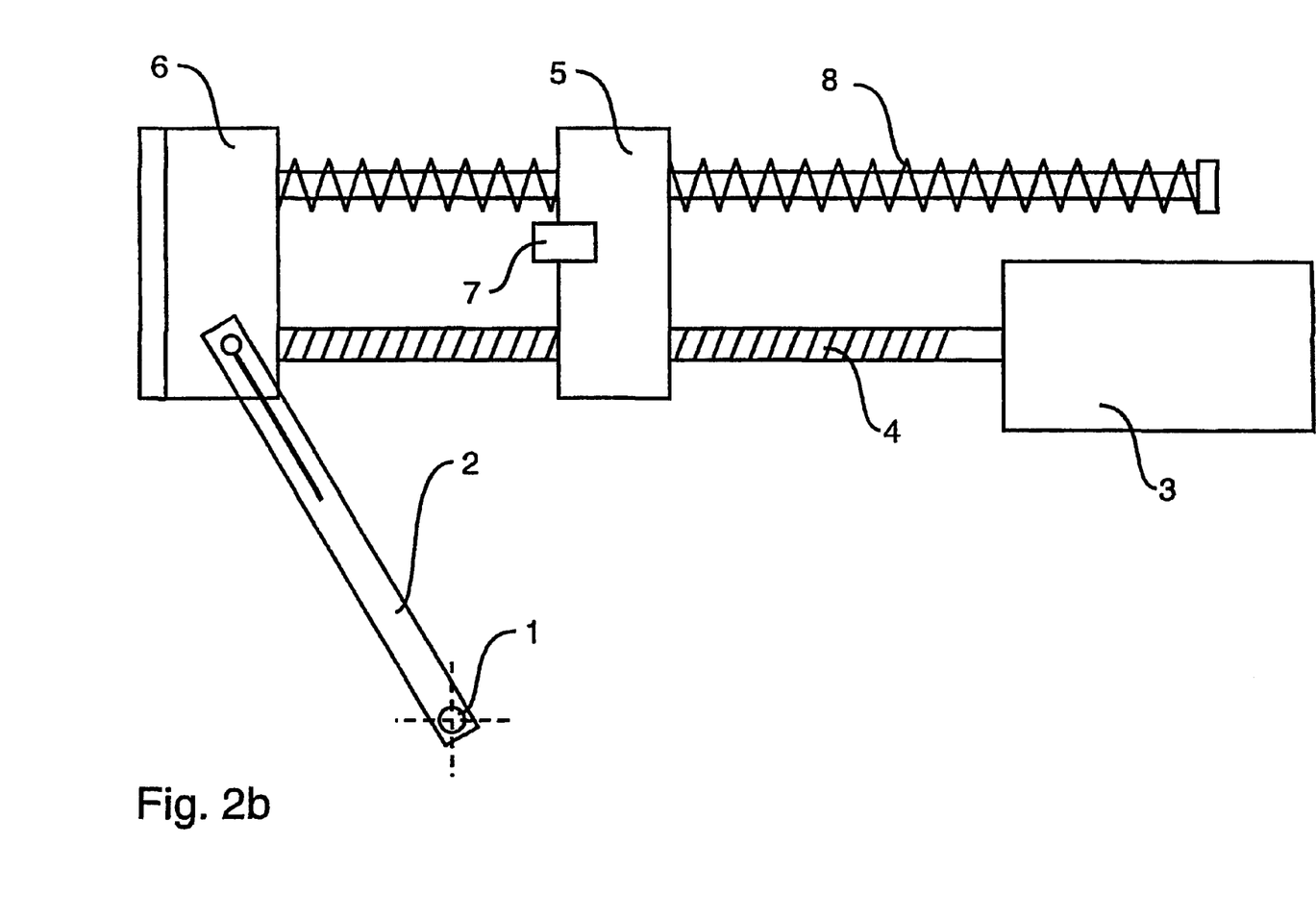

Here, FIG. 2a shows the status of the setting device with a properly functioning power supply, whereas FIG. 2b depicts the status of the setting device in the case of a power supply failure.

A special feature of the exemplary embodiment of a setting device according to the invention shown in FIG. 2a and 2b is that a separate guide 9, 4 is provided in each case for the spindle housing 5 and for the carriage 6.

A further special feature is that the spring 8 does not act on the spindle housing 5, but on a separate thrust bearing 10 that is fixed in space. In this case, the spring 8 therefore pretensions the carriage 6 with respect to the thrust bearing 10.

The exemplary embodiment of a setting device according to the invention shown in FIGS. 3a and 3b largely corresponds to the exemplary embodiment described above and shown in FIGS. 2a and 2b, so the same reference characters are used below and reference is made to the foregoing description in order to avoid repetition.

Figure 3A:
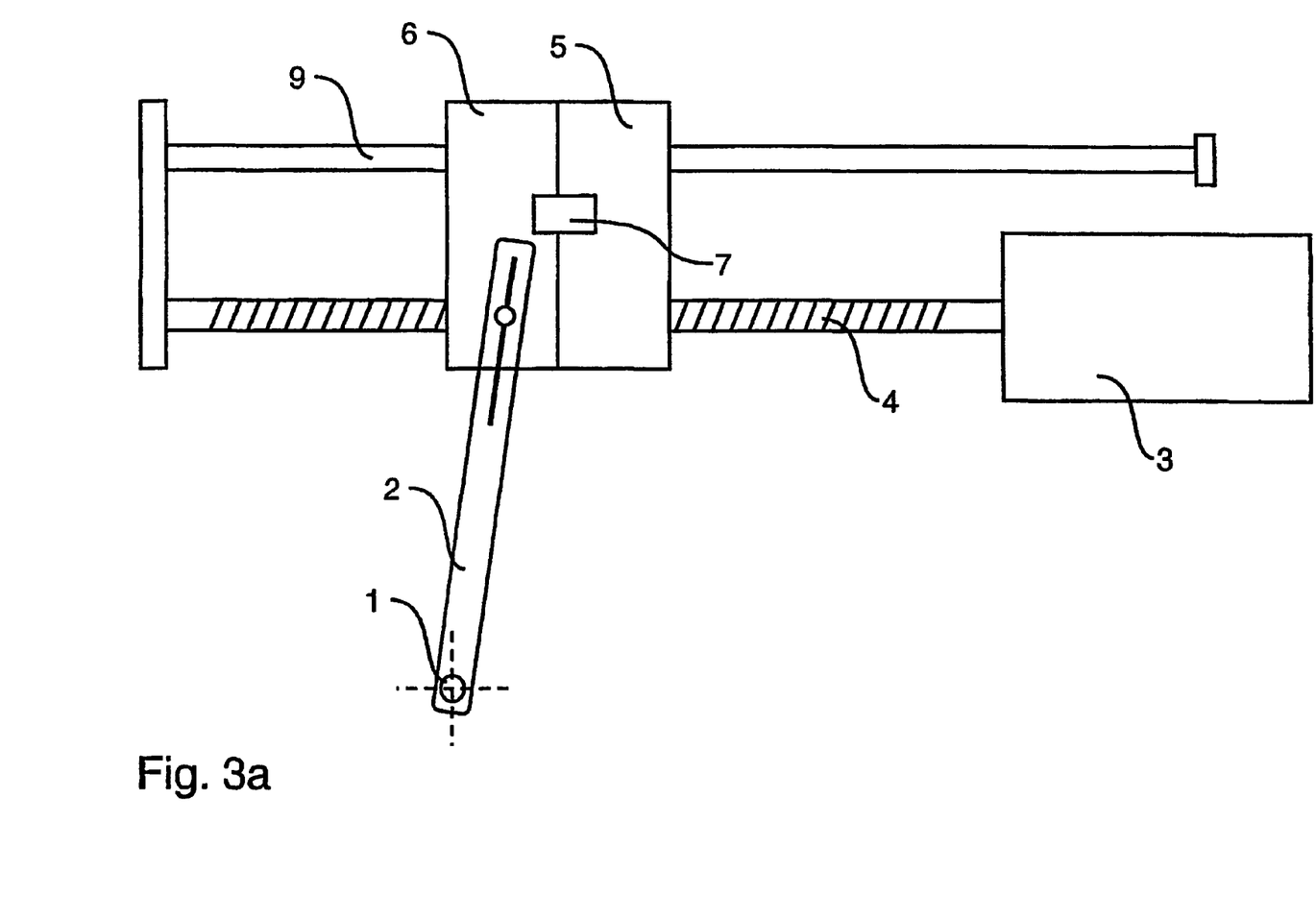
FIGS. 3a and 3b show a setting device according to the invention having a separate guide for the carriage and the carrier, the carriage being pretensioned by a spring disposed between the carriage and the carrier.
Figure 3B:
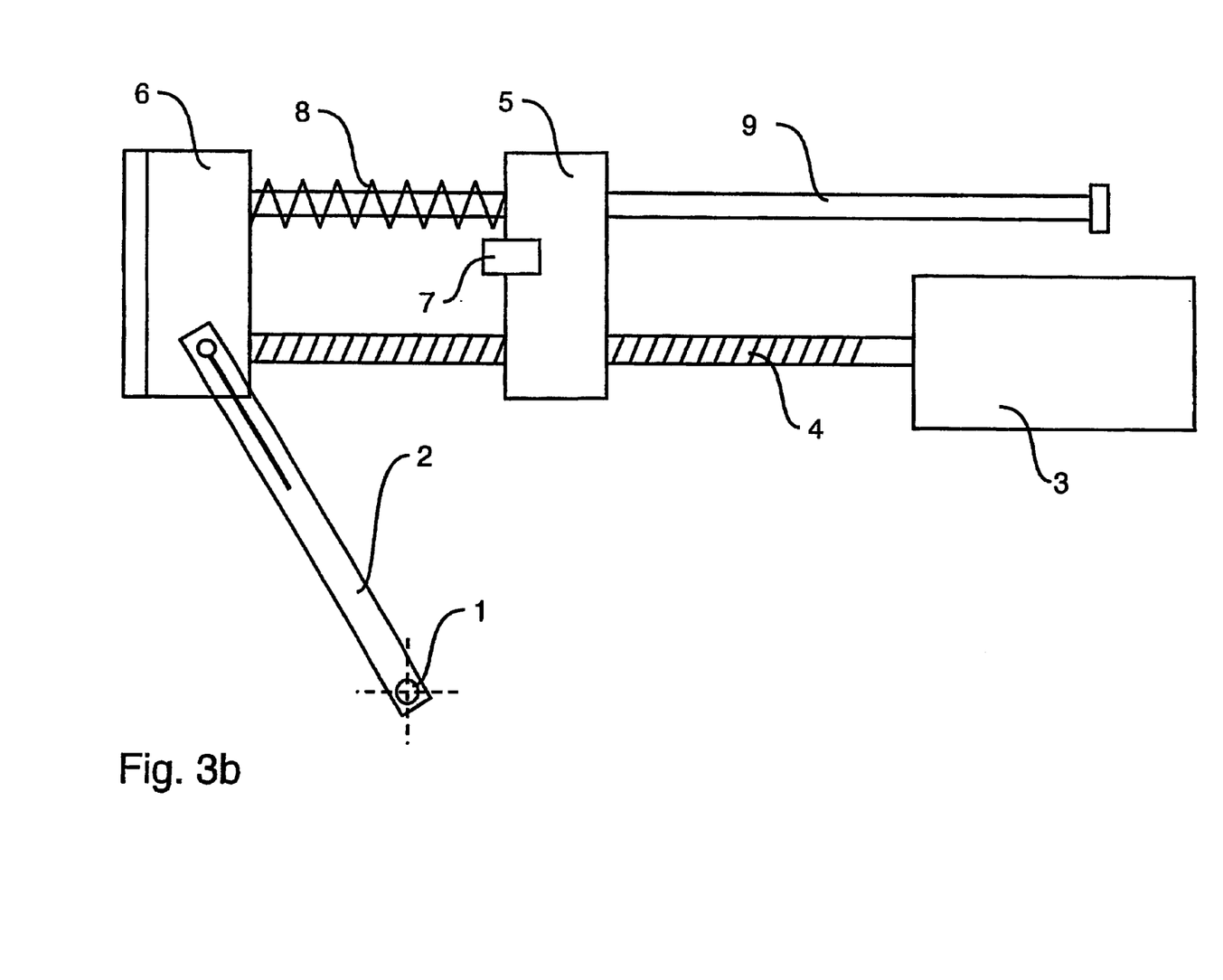

The difference between the exemplary embodiment shown in FIGS. 3a and 3b and the exemplary embodiment shown in FIGS. 2a and 2b is essentially that the spring 8 is disposed between the spindle housing 5 and the carriage 6 and pretensions the carriage 6 with respect to the spindle housing 5.

Finally, FIGS. 4a to 4d shows different exemplary embodiments of compensating elements which can compensate for minor angle setting errors of the setting device according to the invention.

Figure 4A:
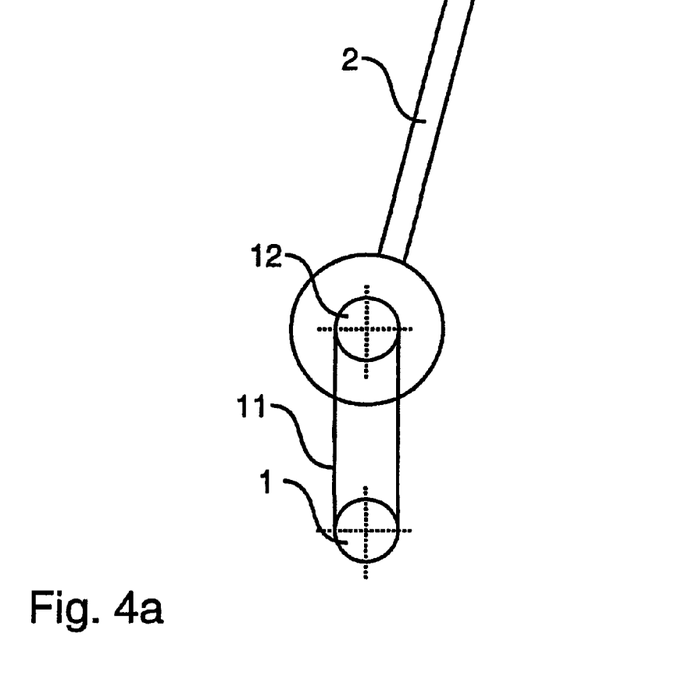
FIGS. 4a–4d show different forms of compensating elements for compensating for minor setting errors.

Thus, in the case of the compensating elements according to FIG. 4a, the control shaft 1 of the automatic transmission is linked via an elastic toothed belt 11 to an auxiliary shaft 12, which is rotated by the lever 2.

Figure 4B:
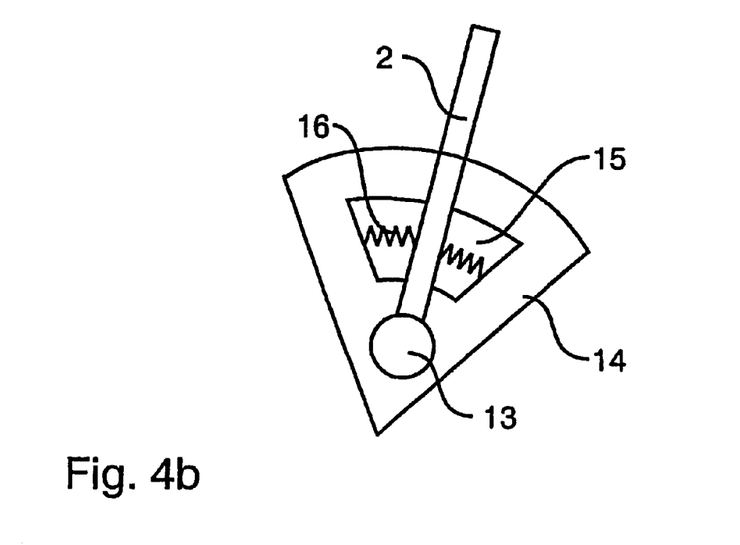

In the case of the compensating element according to FIG. 4b, in contrast, the lever 2 acts on an auxiliary shaft 13, a segment-shaped lever 14 having likewise segment-shaped cutouts 15 being mounted on the control shaft of the automatic transmission, within which cutouts the lever 2 can be turned. Mounted between the lateral edges of the segment-shaped cutout 15 and the lever 2 in this case are springs 16, which press the lever 2 into a center position within the segment-shaped cutout without external forces.

Figure 4C:
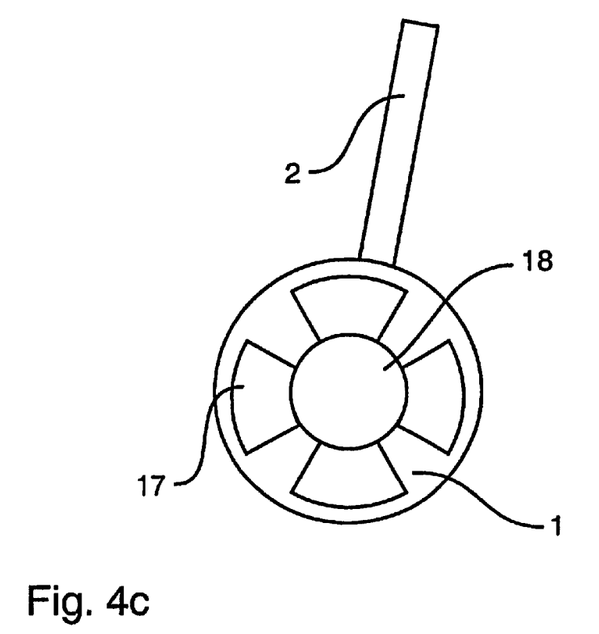

In the exemplary embodiment according to FIG. 4c, the control shaft 1 of the automatic transmission has segment-shaped cutouts 17, in which the buffer elements of an elastic damping material engage, the buffer elements being appropriately adapted in shape and fixed on an auxiliary shaft 18, which is turned by the lever 2.

Figure 4D:
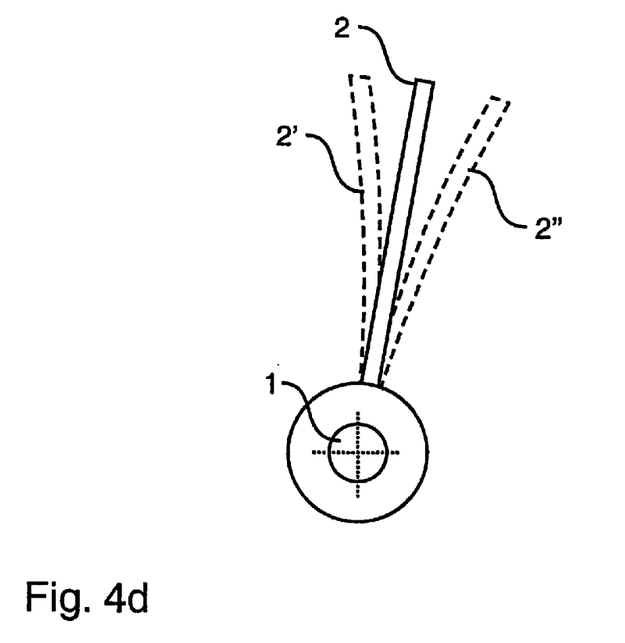

Finally, the lever 2 in the compensating element according to the invention as shown in FIG. 4d is elastic and can, for example, assume the positions 2' and 2" in order to compensate for minor setting errors.

The exemplary embodiment of a setting device according to the invention shown in FIGS. 5a and 5b largely corresponds to the exemplary embodiment described above and shown in FIGS. 3a and 3b, so the same reference characters are used below and reference is made to the foregoing description in order to avoid repetition.

Figure 5A:
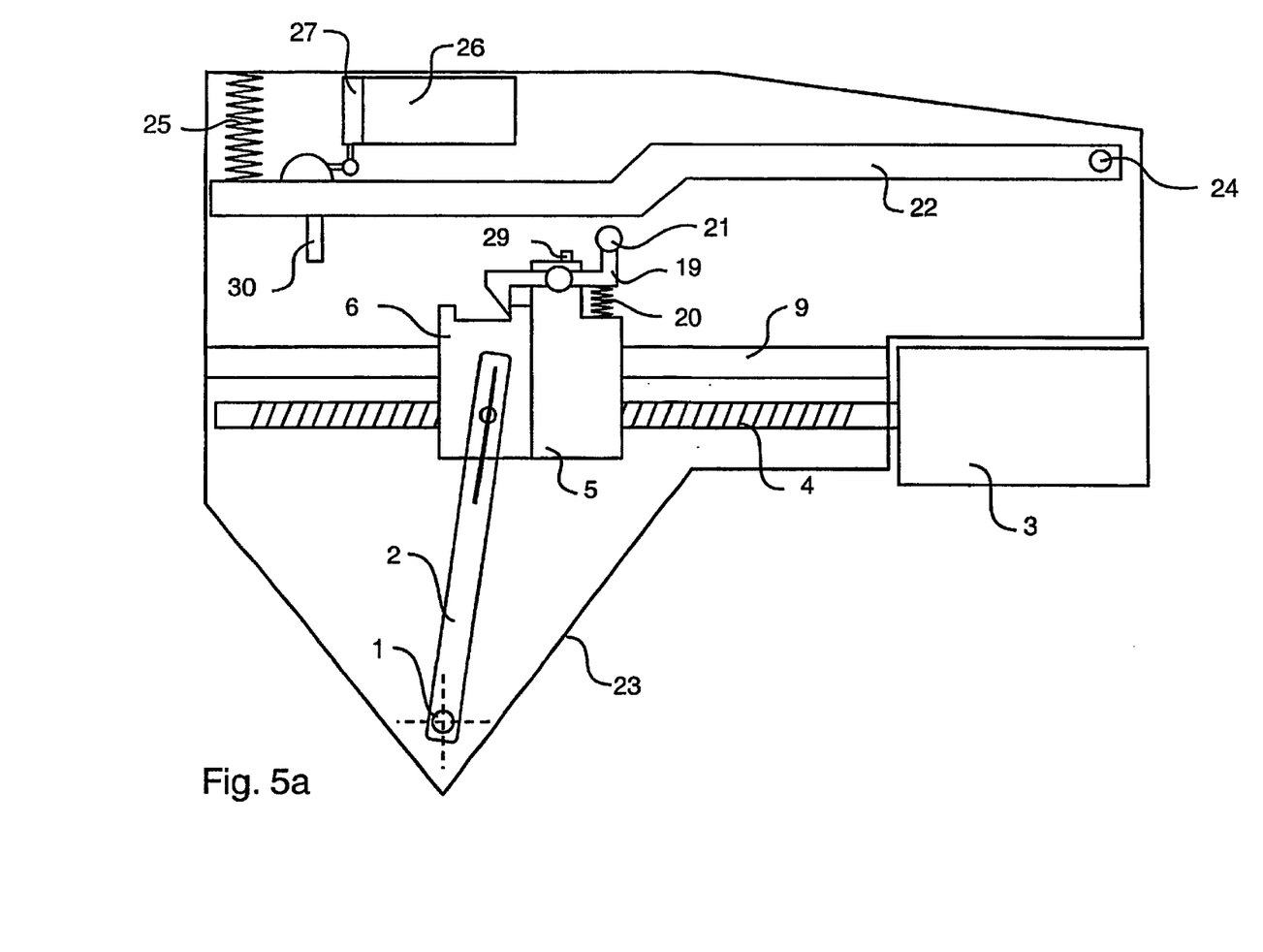
FIGS. 5a and 5b show an alternative exemplary embodiment of a setting device according to the invention having a stationary unlocking device.
Figure 5B:
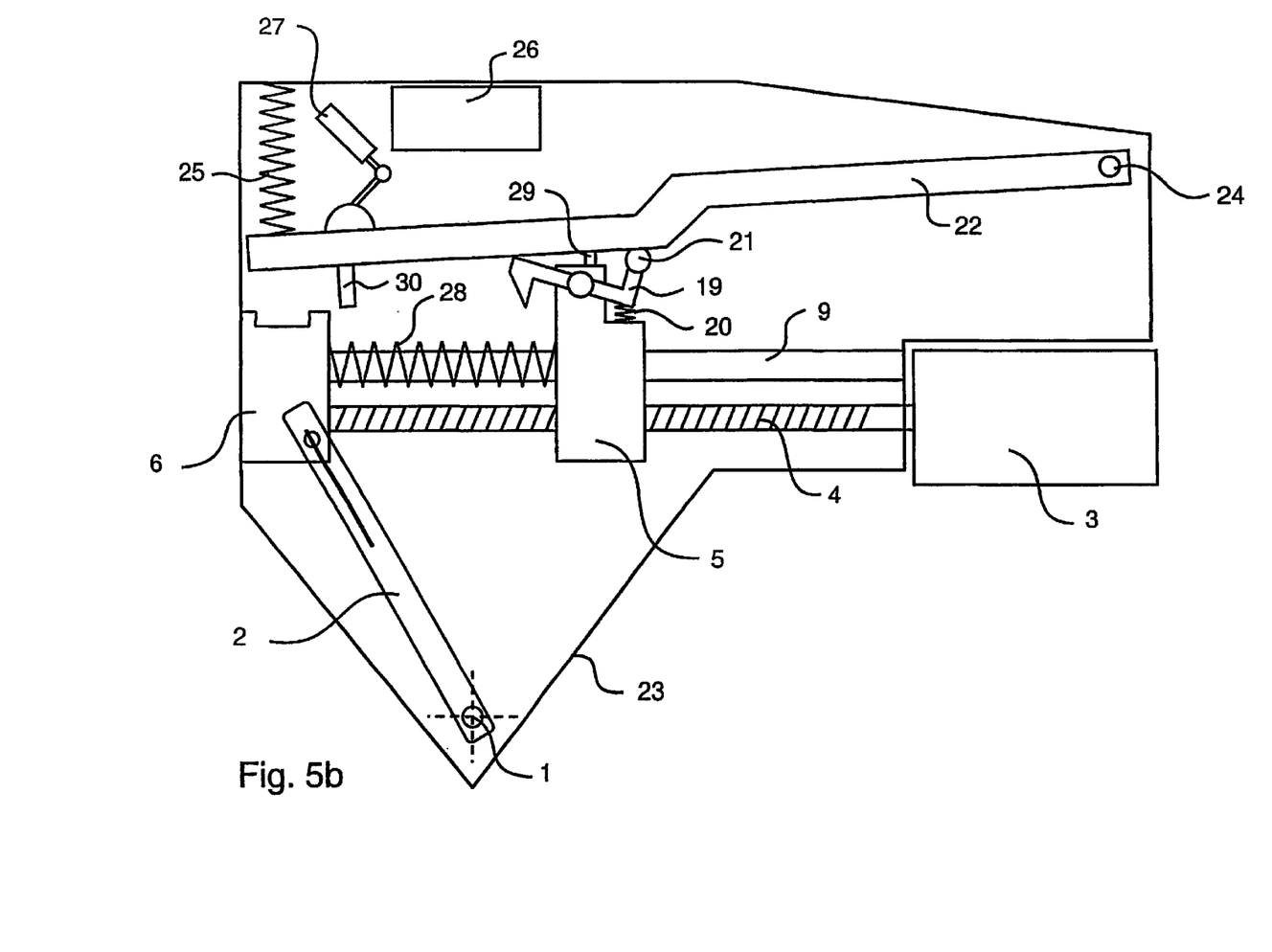

The special feature of the exemplary embodiment shown in FIGS. 5a and 5b is that the unlocking element is stationary, as described in the following.

In order to lock together the spindle housing 5 with the carriage 6, there is provided a locking lever 19 which is pivotably mounted on the top of the spindle housing 5, the locking lever 19 being able to swivel between a locking position and an unlocking position. In the locking position, a bolt mounted on the front side of the locking lever 19 engages in a corresponding cutout on the top of the carriage 6, causing the carriage 6 to be locked together with the spindle housing 5. The locking element further comprises a spring 20, which pretensions the locking lever 19 in the direction of the locking position, such that the locking lever 19 locks together the carriage 6 with the spindle housing 5 when no external forces act upon the locking lever 19. On the side opposite to the bolt, the locking lever 19 has an unlocking button 21, which must be pressed down in order to unlock the locking element.

In order to actuate the locking lever 19, the locking element also has an unlocking lever 22, also referred to as a cam sword, which is pivotably mounted in a housing 23, the unlocking lever 22 being able to swivel about an axis 24 between an unlocking position and a locking position. The unlocking lever 22 is pretensioned here in the direction of the unlocking position by a spring 25. Also provided is an electromagnet 26 in order to maintain the unlocking lever 22 in the locking position shown in FIG. 5a against the pretensioning force of the spring 25. To this end, there is disposed at the top of the unlocking lever 22 a clamping plate 27, which can be gripped by the electromagnet 26. In this arrangement, the clamping plate 27 is pivotably mounted on the housing 23.

The status shown in FIG. 5a will now be described below, wherein the carriage 6 is locked together with the spindle housing 5. In this state, the locking lever 19 engages in the latching projection at the top of the carriage, causing the carriage 6 to be locked together with the spindle housing 5. The locking lever 19 is maintained in this position by the spring 20 until an external force acting on the unlocking button 21 causes the locking lever 19 to rotate in a clockwise direction.

In the locking state shown in FIG. 5a, the electromagnet 26 is energized and consequently attracts the clamping plate 27, thus causing the unlocking lever 22 to be maintained in the locking position shown in FIG. 5a against the pretensioning force of the spring 25.

In the following, the transition from the locking state shown in FIG. 5a to the unlocking state shown in FIG. 5b will now be described. This transition takes place if, for example, the power supply fails. In this case, the electromagnet 26 is de-energized, causing the clamping plate 27 to be released, with the result that the spring 25 turns the unlocking lever 22 counterclockwise. The underside of the unlocking lever 22 then comes into contact with the unlocking button 21 of the locking lever 19 and turns the locking lever 19 in a clockwise direction until the bolt mounted on the front side of the locking lever 19 releases the latching projection on the top of the carriage, thus causing the carriage 6 to be disengaged from the link housing. A spring 28 mounted between the spindle housing 5 and the carriage 6 then causes the carriage 6 to be pushed to the left and finally assume the park position.

The transition from the locking state shown in FIG. 5a to the unlocking state shown in FIG. 5b was described above for the situation in which the power supply fails. However, this transition can also take place if the electromagnet 26 is driven with opposite polarity, causing the electromagnet 26 to repel the clamping plate 27.

In the following, the transition from the unlocking or park position shown in FIG. 5b to the locking position shown in FIG. 5a will now be described. This transition takes place if the power supply of the electromagnet 26 is restored after a temporary failure. In this case, the electric motor 3 rotates the worm shaft 4, causing the spindle housing 5 to be pushed to the left in the direction of the carriage 6. In this process, the spring 28 is put under tension once more in order to be able to push the carriage 6 into the park position again in the event of a subsequent power failure. In addition, a load pin 29 flips out on the top of the spindle housing 5 when the locking lever 19 is unlocked; when the spindle housing 5 moves in the direction of the carriage 6, this load pin causes the unlocking lever 22 to be raised to a point where the electromagnet 26 can grip and attract the clamping plate 27. For this purpose, the unlocking lever 22 has a guide called a load curve, in which the load pin 29 travels along and at the same time raises the unlocking lever 22.

Upon reaching the carriage 6, the locking lever 19 automatically engages in the latching projection on the top of the carriage 6, causing the carriage 6 to lock together once again with the spindle housing 5.

It should further be mentioned that on the underside of the unlocking lever 22 there is mounted a projection 30 which, in the park position, prevents the carriage 6 from being unlocked from the spindle housing 5. In the park position, namely, the spindle housing 5 is located beneath the projection 30, with the result that the unlocking lever 22 cannot be pressed down so far that the locking lever 19 is turned accordingly.

Instead of the projection 30, however, a cutout can also be disposed on the front side of the unlocking lever 22, said cutout being located above the unlocking button 21 and preventing the unlocking lever 22 from pressing down the unlocking button 21 as long as the spindle housing 5 is in the park position.

As an alternative to the embodiment of the locking lever 19 shown in FIGS. 5a and 5b, the locking lever 19 can also be implemented as an articulated lever, the lever arms on both sides of the swiveling axis being at an angle to each other. In this arrangement, a better transmission ratio can be achieved.

The exemplary embodiment shown in FIG. 6 largely corresponds to the exemplary embodiment described above and shown in FIGS. 5a and 5b, so in order to avoid repetition, reference is made to the foregoing description and the same reference characters are used below.

Figure 6:
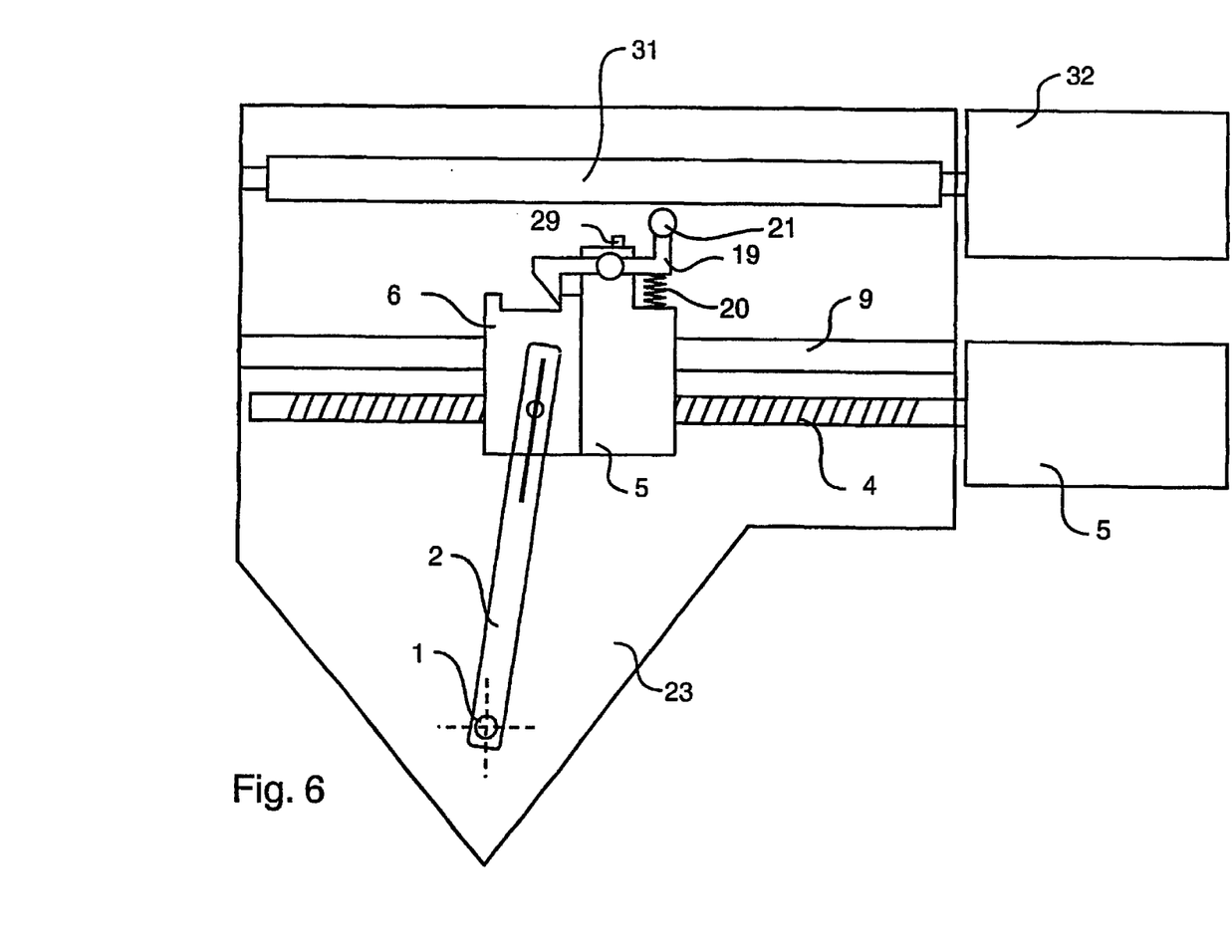
FIG. 6 shows a further alternative exemplary embodiment.

The special feature of the exemplary embodiment shown in FIG. 6 is the manner in which the spindle housing 5 is unlocked from the carriage 6. To this end, there is provided a rotatably mounted camshaft 31, which is disposed above the locking lever 19 and is driven by an electric motor 32. In the position shown in FIG. 6, the camshaft 31 is in the locking position, i.e. the camshaft 31 is not in contact with the unlocking button 21 of the locking lever 19. Conversely, in order to unlock the spindle housing 5 from the carriage 6, the camshaft 31 is rotated through 90°, causing the locking lever 19 to be pressed down.

In one variant, the cross-section of the camshaft 31 deviates from the circular form only over a small angle range of, for example, 90°. As a result, the transmission of energy to achieve the necessary lift is worse than with a radius increasing over the entire circumference of the camshaft 31. The advantage, however, lies in the possibility of the camshaft 31 being supported by the housing along the entire length of the carriage movement. Suitable stops are provided in the end positions. As a result, no motor position control is required. The electric motor 32 must be able to turn in both directions.

In another variant, the electric motor 32 turns in one direction only. This simplifies the control of the electric motor 32. Depending on the operating time, the electric motor 32 may operate the locking lever 19 a number of times, one actuation being sufficient for correct unlocking.

In a further variant, the camshaft has a radius that increases over its entire circumference, which results in a better transmission of energy. Stops are provided at the end positions, with the result that no motor position control is required. In this case, the electric motor 32 must be able to turn in both directions.

Finally, the camshaft 31 can also exhibit an increasing radius over its entire circumference, the transition being rounded. In this case the electric motor 32 turns in one direction only. This simplifies the control of the electric motor 32. Depending on the operating time, the electric motor 32 may operate the locking lever 19 a number of times, one simple actuation being sufficient for correct unlocking.

If no stops are provided at the end positions of the camshaft, it is necessary to provide either a sensor system for determining the angle position or a clutch between the electric motor 32 and the camshaft 31.

Behind the lever 2 in the pivoting plane of the lever 2 there is further disposed a sensor mat, which enables the setting angle of the lever 2 to be determined.

The invention is not limited to the above-described exemplary embodiments according to the invention. Rather, a plurality of variants and adaptations that make use of the inventive idea are conceivable and therefore also fall within the scope of protection.

What is claimed is:

1. A setting device for an adjustable gearing mechanism for selecting a parking position in an automatic transmission, comprising a setting element having a setting motion;

an intermediate gearing mechanism for transferring the setting motion of the setting element to a control element of the adjustable gearing mechanism, the intermediate gearing mechanism comprising a movably mounted carrier linked to the setting element via a spindle, a carriage mounted in a linearly movable manner in parallel with the carrier and linked to the control element, and a controllable locking element to link the carriage to the carrier or separate it from the carrier; and a mechanical energy store for driving the carriage in the event of a failure of the setting element.

2. A setting device according to claim 1, wherein the energy store comprises a spring.

3. A setting device according to claim 2, wherein the energy store comprises a helical spring.

4. A setting device according to claim 1, wherein the locking element comprises an electromagnet.

5. A setting device according to claim 2, wherein the spring is disposed between the carrier and the carriage and pretensions the carrier with respect to the carriage.

6. A setting device according to claim 2, wherein the spring is disposed between the carriage and a thrust bearing fixed in space and pretensions the carriage with respect to the thrust bearing.

7. A setting device according to claim 1, wherein the carrier has a guide for movable mounting of the carriage.

8. A setting device according to claim 1, further comprising a guide fixed in space for movable mounting of the carriage.

9. A setting device according to claim 1, wherein the link between the setting element and the carrier is self-locking.

10. A setting device according to claim 9, wherein the setting element has an electric motor which drives the spindle in order to move the carrier.

11. A setting device according to claim 1, further comprising a stationary unlocking element for unlocking the locking element.

12. A setting device according to claim 11, wherein the locking element has a locking lever pivotable between a locking position and an unlocking position, the locking lever being pretensioned in the direction of the locking position by a spring.

13. A setting device according to claim 12, wherein said unlocking element has an unlocking lever pivotable between a locking position and an unlocking position, the unlocking lever being pretensioned in the direction of the unlocking position by a second spring and maintained in the locking position by an electromagnet in normal operation, wherein the unlocking lever in the unlocking position brings the locking lever into the unlocking position against the force of the first spring.

14. Setting device according to claim 13, wherein the locking lever is an articulated lever.

15. A setting device according to claim 11, wherein the unlocking element is a rotatably mounted camshaft.

16. A setting device according to claim 1, wherein the intermediate gearing mechanism has a compensating element in order to compensate for minor setting errors.

17. A setting device according to claim 16, wherein the compensating element comprises a flexible elastic lever.

18. A setting device according to claim 16, wherein the compensating element has a flexible loop belt.

19. A setting device according to claim 18, wherein the loop belt is selected from the group of belts consisting of toothed belts, V-belts, flat belts and square belts.

20. A setting device according to claim 16, wherein the compensating element has a drive end and an output end, said ends having transmission elements which are rotatable relative to each other and are tensioned against each other by at least one spring.

21. A setting device according to claim 16, wherein the compensating element has a drive end and an output end, said ends having transmission elements which are rotatable relative to each other and are linked to each other by at least one elastic, damping buffer element.

22. A setting device for an adjustable gearing mechanism for selecting a parking position in an automatic transmission, comprising:
    a setting element;
    an intermediate gearing mechanism comprising a (i) carrier linked to the setting element, (ii) a carriage mounted in parallel with the carrier, and (iii) a locking element to link the carriage to the carrier or separate it from the carrier; and
    a mechanical energy store for driving the carriage in the event of a failure of the setting element.

23. A setting device according to claim 22, wherein the energy store comprises a spring.

24. A setting device according to claim 23, wherein the energy store comprises a helical spring.

25. A setting device according to claim 22, wherein the locking element comprises an electromagnet.

26. A setting device according to claim 23, wherein the spring is disposed between the carrier and the carriage.

27. A setting device according to claim 23, wherein the spring is disposed between the carriage and a thrust bearing and pretensions the carriage with respect to said bearing.

28. A setting device according to claim 22, wherein the carrier has a guide for mounting of the carriage.

29. A setting device according to claim 22, further comprising a fixed guide for mounting of the carriage.

30. A setting device according to claim 22, wherein the link between the setting element and the carrier is self-locking.

31. A setting device according to claim 30, wherein the setting element has a motor to move the carrier.

32. A setting device according to claim 22, further comprising an unlocking element.

33. A setting device according to claim 32, wherein the locking element has a locking lever pivotable between a locking position and an unlocking position.

34. A setting device according to claim 32, wherein said unlocking element has an unlocking lever pivotable between a locking position and an unlocking position.

35. A setting device according to claim 33, wherein the locking lever is an articulated lever.

36. A setting device according to claim 32, wherein the unlocking element is a camshaft.

37. A setting device according to claim 22, wherein the intermediate gearing mechanism compensates for errors.

38. A setting device according to claim 37, wherein the compensating element comprises a flexible lever.

39. A setting device according to claim 37, wherein the compensating element has a flexible belt.

40. A setting device according to claim 39, wherein the belt is selected from the group of belts consisting of toothed belts, V-belts, flat belts and square belts.

41. A setting device according to claim 37, wherein the compensating element has a drive end and an output end, said ends having transmission elements which are rotatable relative to each other and are spring tensioned against each other.

42. A setting device according to claim 37, wherein the compensating element has a drive end and an output end, said ends having transmission elements linked to each other by at least one damping buffer element.

* * * * *